United States Patent
Zhang et al.

(10) Patent No.: US 10,871,857 B2
(45) Date of Patent: Dec. 22, 2020

(54) TOUCH PANEL BEING ABLE TO REALIZE FORCE TOUCH AND TOUCH DETECTION METHOD THEREOF AND DISPLAY DEVICE

(71) Applicants: BOE TECHNOLOGY GROUP CO., LTD., Beijing (CN); BEIJING BOE DISPLAY TECHNOLOGY CO., LTD., Beijing (CN)

(72) Inventors: Kan Zhang, Beijing (CN); Weitao Chen, Beijing (CN); Bin Zhang, Beijing (CN); Pengming Chen, Beijing (CN); Guangxing Wang, Beijing (CN); Qiang Zhang, Beijing (CN); Dianzheng Dong, Beijing (CN)

(73) Assignees: BOE TECHNOLOGY GROUP CO., LTD., Beijing (CN); BEIJING BOE DISPLAY TECHNOLOGY CO., LTD., Beijing (CN)

( * ) Notice: Subject to any disclaimer, the term of this patent is extended or adjusted under 35 U.S.C. 154(b) by 361 days.

(21) Appl. No.: 15/761,248

(22) PCT Filed: Jun. 27, 2017

(86) PCT No.: PCT/CN2017/090236
§ 371 (c)(1),
(2) Date: Mar. 19, 2018

(87) PCT Pub. No.: WO2018/054116
PCT Pub. Date: Mar. 29, 2018

(65) Prior Publication Data
US 2020/0241692 A1 Jul. 30, 2020

(30) Foreign Application Priority Data
Sep. 26, 2016 (CN) .......................... 2016 1 0853247

(51) Int. Cl.
G06F 3/042 (2006.01)
G06F 3/044 (2006.01)
G06F 3/041 (2006.01)

(52) U.S. Cl.
CPC .......... *G06F 3/0421* (2013.01); *G06F 3/0412* (2013.01); *G06F 3/0414* (2013.01); *G06F 3/0446* (2019.05); *G06F 2203/04107* (2013.01)

(58) Field of Classification Search
CPC .... G06F 3/0421; G06F 3/0446; G06F 3/0412; G06F 3/0414; G06F 2203/04107
See application file for complete search history.

(56) References Cited

U.S. PATENT DOCUMENTS

2015/0070285 A1   3/2015  Qiu
2017/0285790 A1*  10/2017  Barel .................... G06F 3/0414

FOREIGN PATENT DOCUMENTS

CN    102799319 A    11/2012
CN    103455205 A    12/2013
(Continued)

OTHER PUBLICATIONS

The First Chinese Office Action dated Aug. 20, 2018; Appln No. 201610853247.7.
(Continued)

*Primary Examiner* — Lisa S Landis (57) ABSTRACT

A touch panel, a display device and a touch detection method are provided. The touch panel includes a base substrate, a plurality of transmitter groups and a receiver. The base substrate has a touch surface configured to receive a touch operation, each of the plurality of transmitter groups includes a plurality of transmitters. The transmitters are configured to emit light, the receiver is configured to receive light emitted by the transmitters. the base substrate is configured to produces a deformation upon receiving the
(Continued)

touch operation, the light received by the receiver corresponds to the deformation.

17 Claims, 7 Drawing Sheets

(56) References Cited

FOREIGN PATENT DOCUMENTS

| | | |
|---|---|---|
| CN | 103518184 A | 1/2014 |
| CN | 104991685 A | 10/2015 |
| CN | 106406617 A | 2/2017 |
| EP | 2689320 B1 | 1/2014 |

OTHER PUBLICATIONS

International Search Report and Written Opinion dated Oct. 10, 2017; PCT/CN2017/090236.
The Second Chinese Office Action dated Jan. 31, 2019; Appln. No. 201610853247.7.

* cited by examiner

```
┌─────────────────────────────────────────────────┐
│ using the plurality of transmitters to emit the light parallel to │
│ the touch surface, and making the light incident on the          │──── S601
│ receiver disposed correspondingly thereto                        │
└─────────────────────────────────────────────────┘
                          │
                          ▼
┌─────────────────────────────────────────────────┐
│ detecting whether the receiver receives the light to judge │──── S602
│ whether a touch operation occurs                           │
└─────────────────────────────────────────────────┘
```

TOUCH PANEL BEING ABLE TO REALIZE FORCE TOUCH AND TOUCH DETECTION METHOD THEREOF AND DISPLAY DEVICE

TECHNICAL FIELD

Embodiments of the present disclosure relate to a touch panel, a display device and a touch detection method.

BACKGROUND

Currently, with continuous development of touch technology, the touch technology has been widely used in electronic products such as a mobile phone, a tablet computer, a laptop and so on. Generally, the touch technology includes optical, resistive, capacitive, electromagnetic touch technologies and other different technical directions.

Force touch technology may sense the pressure of a touch operation, and correspond to different operation commands, so as to callout different corresponding functions, enrich user's level of touch interaction and improve a user experience.

SUMMARY

At least one embodiment of the present disclosure provides a touch panel, a display device and a touch detection method.

At least one embodiment of the present disclosure provides a touch panel, which includes a base substrate, having a touch surface; a plurality of transmitter groups, each of the plurality of transmitter groups includes a plurality of transmitters; and a receiver, the transmitters are configured to emit light, the receiver is disposed corresponding to the transmitter groups and configured to receive light emitted by the plurality of transmitters in the transmitter groups corresponding to the receiver, the transmitter groups are disposed on a side of the base substrate away from the touch surface, and the plurality of transmitters in each of the transmitter groups are arranged in a direction perpendicular to the touch surface.

For example, in the touch panel provided by an embodiment of the present disclosure, the receiver includes a plurality of sub-receivers, different sub-receivers receive the light emitted by different transmitters in each of the transmitter groups.

For example, the touch panel provided by an embodiment of the present disclosure, further includes: a light shield layer, the light shield layer is disposed between the base substrate and the transmitter groups, the light shield layer is configured to prevent light from the touch surface which has a wavelength the same as that of the light emitted by the plurality of transmitters from entering the receiver.

For example, in the touch panel provided by an embodiment of the present disclosure, the light shield layer is a photonic crystal layer.

For example, the touch panel provided by an embodiment of the present disclosure further includes: a plurality of photonic crystal protrusions, disposed at intervals on a side of the photonic crystal layer far away from the touch surface.

For example, in the touch panel provided by an embodiment of the present disclosure, the transmitters are configured to emit infrared light.

For example, in the touch panel provided by an embodiment of the present disclosure, the photonic crystal layer has a bandgap range of 780 nm-2500 nm.

For example, in the touch panel provided by an embodiment of the present disclosure, the base substrate includes a display panel.

For example, in the touch panel provided by an embodiment of the present disclosure, the plurality of transmitter groups include row transmitter groups arranged in a first direction and column transmitter groups arranged in a second direction, the first direction is perpendicular to the second direction.

For example, the touch panel provided by an embodiment of the present disclosure further includes a plurality of self-capacitance electrodes arranged in a matrix which are disposed on the base substrate.

For example, the touch panel provided by an embodiment of the present disclosure further includes a plurality of touch driving electrodes and a plurality of touch sensing electrodes which are disposed on the base substrate.

For example, in the touch panel provided by an embodiment of the present disclosure, the receiver further includes a photoelectric conversion element, the touch panel further includes an amplification circuit disposed corresponding to the photoelectric conversion element and an analyzing circuit in communication with the amplification circuit.

At least one embodiment of the present disclosure provides a display device, which includes any touch panel as mentioned above.

At least one embodiment of the present disclosure provides a touch detection method for the touch panel as mentioned above, which includes using the plurality of transmitters to emit the light parallel to the touch surface, and making the light enter the receiver disposed corresponding thereto; and detecting whether the receiver receives the light to judge whether a touch operation occurs.

For example, the touch detection method provided by an embodiment of the present disclosure further includes detecting light intensity received by the receiver to judge a magnitude of pressure of the touch operation.

For example, in the touch detection method provided by an embodiment of the present disclosure, the receiver includes a plurality of sub-receivers, the light emitted by different transmitters in each of the transmitter groups is received by different sub-receivers, the method further includes detecting number of the sub-receivers that receive the light in the plurality of sub-receivers disposed in one-to-one correspondence with the plurality of transmitters in a same transmitter group to judge the magnitude of the pressure of the touch operation.

For example, in the touch detection method provided by an embodiment of the present disclosure, the receiver includes a photoelectric conversion element, the method further includes using the photoelectric conversion element in the receiver to convert the light received by the receiver to an induction current; amplifying the induction current; and detecting a magnitude of the induction current after amplifying to judge whether the receiver receives the light and the light intensity that is received.

For example, the touch detection method provided by an embodiment of the present disclosure further includes generating different touch commands according to the magnitude of the pressure of the touch operation.

BRIEF DESCRIPTION OF THE DRAWINGS

In order to clearly illustrate the technical solution of embodiments of the present disclosure, the drawings of the embodiments will be briefly described in the following, it is obvious that the drawings in the description are only related

DETAILED DESCRIPTION

In order to make objects, technical details and advantages of the embodiments of the present disclosure apparently, the technical solutions of the embodiments will be described in a clearly and fully understandable way in connection with the drawings related to the embodiments of the present disclosure. It is obvious that the described embodiments are just a part but not all of the embodiments of the present disclosure. Based on the described embodiments herein, a person having ordinary skill in the art may obtain other embodiment(s), without any inventive work, which should be within the scope of the disclosure.

Unless otherwise defined, the technical terms or scientific terms used herein have the same meanings as commonly understood by one of ordinary skill in the art to which the present disclosure belongs. The terms "first," "second," etc., which are used in the description and the claims of the present disclosure, are not intended to indicate any sequence, amount or importance, but distinguish various components. The terms "comprises," "includes," etc., are intended to specify that the elements or the objects stated before these terms encompass the elements or the objects and equivalents thereof listed after these terms, but do not preclude the other elements or objects. The phrases "connect", "connected", etc., are not intended to define a physical connection or mechanical connection, but may include an electrical connection, directly or indirectly.

With continuous development of touch technology, people have a strong demand for a touch manner which utilizes a pressure perception to generate an operation command. However, the inventor(s) of the present application has found that, a usual force touch panel realizes force touch by adding an additional touch electrode structure used for force touch on an original touch panel, the usual force touch panel has a complicated structure which is not conductive to a lighter and thinner trend of a touch product. On the other hand, a usual infrared touch panel senses a touch operation by using an object or a finger to block an infrared light transmission path to make an infrared receiver experience a change, however, because of the lack of a filter device, an infrared band of an external ambient light may interfere the judgment of the infrared touch panel on the touch operation, which makes the infrared touch panel has a poor accuracy.

Embodiments of the present disclosure provide a touch panel, a display device and a touch detection method. The touch panel includes a base substrate, a plurality of transmitter groups and a receiver. The base substrate has a touch surface, each of the transmitter groups includes a plurality of transmitters. The transmitters are configured to emit light, the receiver is disposed corresponding to the transmitter groups and configured to receive light emitted by the plurality of transmitters in the transmitter groups disposed corresponding to the receiver. The transmitter groups are disposed on a side of the base substrate away from the touch surface, and the plurality of transmitters in each of the transmitter groups are arranged in a direction perpendicular to the touch surface. Therefore, the touch panel provides a new type of force touch panel, the touch panel utilizes the plurality of transmitters arranged in the direction perpendicular to the touch surface and the receiver which is disposed corresponding to the plurality of transmitters and used to receive the light emitted by the plurality of transmitters to sense a magnitude of pressure of a touch operation, so as to realize force touch. The touch panel has a simple structure, and has no need to use various touch electrodes and leads, so as to reduce and even eliminate the interference of an electrical signal on the touch electrodes on a display panel, and reduce and even eliminate the influence of the touch electrodes and the leads on light transmittance of the display panel.

Hereafter, the touch panel, the display device and the touch detection method provided by the embodiments of the present disclosure will be described below with reference to the drawings.

First Embodiment

Figure 1:
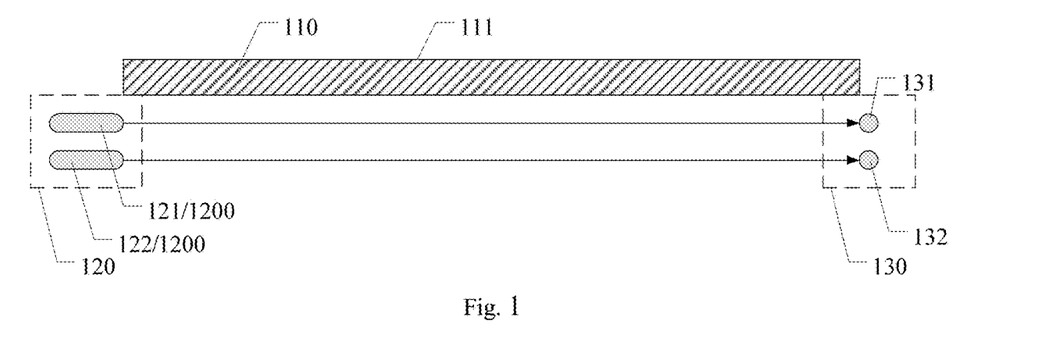
FIG. 1 is a structural schematic diagram of a touch panel provided by an embodiment of the present disclosure.

The present embodiment provides a touch panel, as illustrated in FIG. 1, the touch panel includes a base substrate 110, a plurality of transmitter groups 120 and a receiver 130. The base substrate 110 has a touch surface 111, the touch surface 111 is a surface that is touched by a finger or a touch pen upon a touch operation occurring. Each of the transmitter groups includes a plurality of transmitters 1200, as illustrated in FIG. 1, the transmitter groups 120 include a first transmitter 121 and a second transmitter 122. The receiver 130 is disposed corresponding to the transmitter groups 120 and configured to receive light emitted by the plurality of transmitters in the transmitter groups 120, for example, the receiver 130 may receive the light emitted by the first transmitter 121 and the second transmitter 122. The transmitter groups 120 are disposed on a side of the base substrate 110 away from the touch surface 111 and the first transmitter 121 and the second transmitter 122 in the transmitter groups 120 are arranged in a direction perpendicular to the touch surface 111, for example, the first transmitter 121 and the second transmitter 122 are sequentially disposed in the direction perpendicular to the touch surface 111. It should be noted that, the abovementioned "the receiver is disposed corresponding to the transmitter groups" refers to that the light emitted by the transmitters in the transmitter group can be received by the receiver disposed corresponding to the transmitter group. In addition, the arrangement of the first transmitter 121 and the second transmitter 122 along the direction perpendicular to the touch surface 111 does not strictly requires that a connection line between the first transmitter 121 and the second transmitter 122 is strictly perpendicular to the touch surface 111.

For example, in the touch panel provided by an embodiment of the present disclosure, the light emitted by each of the transmitters is parallel to the touch surface, as illustrated in FIG. 1, the light emitted by the first transmitter 121 is parallel to the touch surface 111, the light emitted by the second transmitter 122 is parallel to the touch surface 111.

Figure 2:
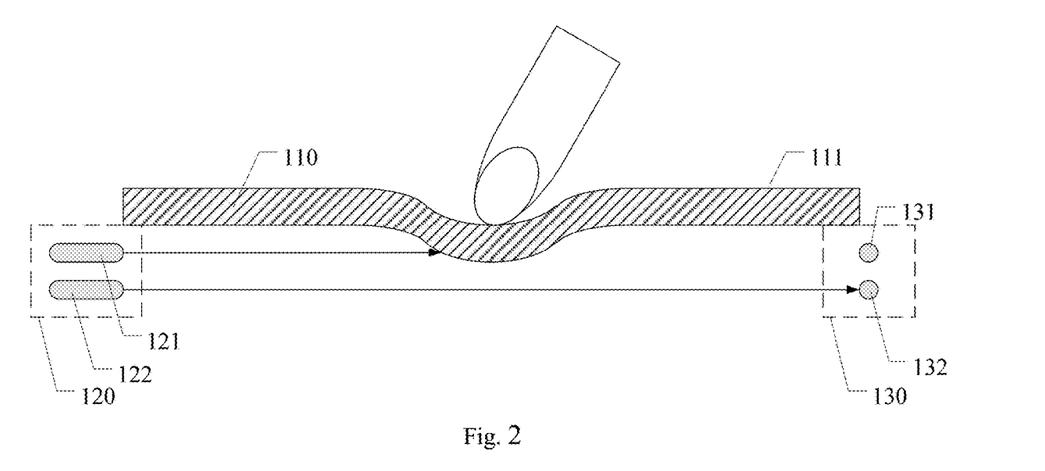
FIG. 2 is a schematic diagram of a touch panel upon being touched provided by an embodiment of the present disclosed.
Figure 3:
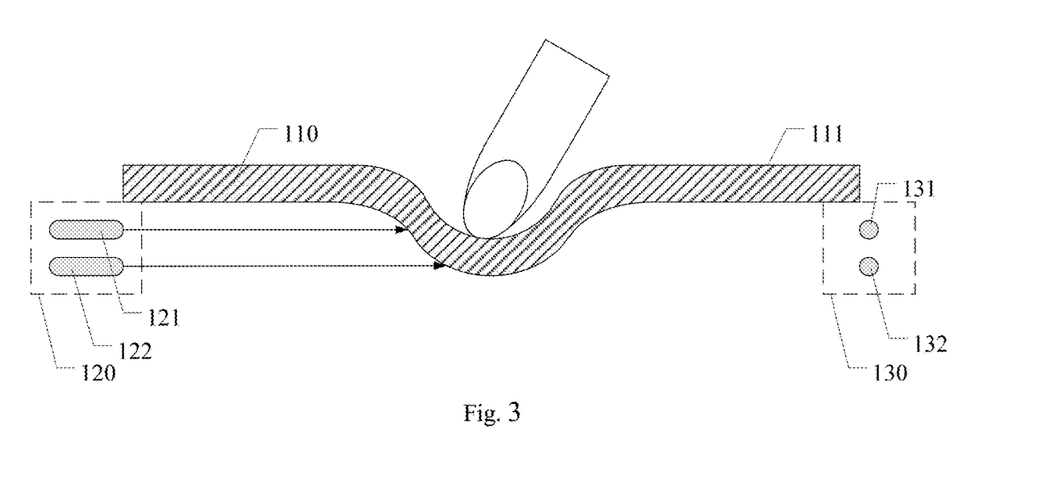
FIG. 3 is a schematic diagram of another touch panel upon being touched provided by an embodiment of the present disclosure.

In the touch panel provided by the present embodiment, because the plurality of transmitters in the transmitter groups are arranged in the direction perpendicular to the touch surface, and the receiver receives the light emitted by the plurality of transmitters in the transmitter groups disposed correspondingly thereto. As illustrated in FIG. 2 to FIG. 3, when a touch operation occurs, the operation that a finger or a touch pen presses the touch surface 111 will result in a certain deformation of the base substrate. As the pressure of the touch operation increases, an amount of the deformation generated by the base substrate 110 may also increase. For example, as illustrated in FIG. 1, when no touch operation occurs, the base substrate 110 is not deformed, the light emitted by the first transmitter 121 and the second transmitter 122 in the transmitter groups 120 enters the receiver 130; as illustrated in FIG. 2, when the pressure of the touch operation is relative small, the deformation generated on the base substrate 110 only prevents the light emitted by the first transmitter 121 from entering the receiver 130; as illustrated in FIG. 3, when the pressure of the touch operation is relative large, the deformation generated on the base substrate 110 simultaneously prevents the light emitted by the first transmitter 121 and the second transmitter 122 from entering the receiver 130. Therefore, the light received by the receiver 130 changes according to the pressure of the touch operation, so that the presence or absence of the touch operation and the magnitude of the pressure of the touch operation can be judged through the change of the light received by the receiver may judge. Therefore, the touch panel provides a new type of force touch panel. And the touch panel has a simple structure, and has no need to use various touch electrodes and leads, so as to reduce and even eliminate the interference of an electrical signal on the touch electrodes on the display panel, and reduce and even eliminate the influence of the touch electrodes and the leads on the light transmittance of the display panel. In addition, because the speed of light transmission is faster, the light may not be influenced by a size of the display panel, a resistance of the touch electrodes and other factors, the touch panel provided by the present embodiment may be applied to a large size and even an oversized touch product.

It should be noted that, the number of the receiver may be one, in this case, the receiver is disposed corresponding to the plurality of transmitter groups, which means that the plurality of transmitters may share one receiver, at this point, the magnitude of the pressure of the touch operation may be judged by the amount of radiation or photon received by the receiver, for example, the greater the amount of the radiation or the photon received by the receiver, the greater the pressure of the touch operation. Certainly, the number of the receiver may be multiple, in this case, a plurality of receivers are disposed in one-to-one correspondence with the plurality of transmitter groups, therefore, a position of the touch operation may be judged by judging a position of the receivers received the light, for example, when the plurality of receivers are disposed in one-to-one correspondence with the plurality of transmitter groups and arranged in a row or a column direction, the position of the touch operation may be judged according to the row or the column where the receivers receive the light; and the magnitude of the pressure of the touch operation may be judged according to the amount of the radiation or the photon received by the receivers.

For example, in the touch panel provided by an example of the present embodiment, as illustrated in FIG. 1 to FIG. 3, the receiver 130 includes a plurality of sub-receivers, for example, the receiver 130 includes a first sub-receiver 131 and a second sub-receiver 132. The light emitted by different transmitters in each of the transmitter groups is received by different sub-receivers, that is, the plurality of sub-receivers in the receiver 130 are disposed in one-to-one correspondence with the plurality of transmitters in the transmitter groups 120 disposed corresponding to the receiver 130. For example, as illustrated in FIG. 1 to FIG. 3, in the transmitter groups 120 and the receiver 130 which in correspondence with each other, the first transmitter 121 is disposed corresponding to the first sub-receiver 131, the light emitted by the first transmitter 121 is received by the first sub-receiver 131; the second transmitter 122 is disposed corresponding to the second sub-receiver 132, the light emitted by the second transmitter 122 is received by the second sub-receiver 132. Therefore, the receiver may judge the magnitude of the pressure of the touch operation by judging the number of the sub-receivers that receive the light. For example, as illustrated in FIG. 1, when no touch operation occurs, in the receiver 130, the first sub-receiver 131 receivers the light emitted by the first transmitter 121, the second sub-receiver 132 received the light emitted by the second transmitter 122, at this point, the number of the sub-receivers that receive the light in the receiver 130 is 2; when the touch operation occurs and the touch pressure is relative small, in the receiver 130, the first sub-receiver 131 does not receive the light, the second sub-receiver 132 receives the light emitted by the second transmitter 122, at this point, the number of the sub-receivers that receive the tight in the receiver 130 is 1; when the touch operation occurs and the touch pressure is relative large, none of the first sub-receiver 131 and the second sub-receiver 132 in the receiver 130 receives the light, at this point, the number of the sub-receivers that receive the light in the receiver 130 is 0. Therefore, the presence or absence and the magnitude of the pressure of the touch operation may be judged by judging the number of sub-receivers (for example, 0, 1 or 2) that receive the light.

It should be noted that, the receiver as mentioned above may be an entire receiver, that is, the receiver does not include the plurality of sub-receivers. The magnitude of the pressure of the touch operation may be judged by judging the amount of the radiation or the photon received by the receiver.

For example, in the touch panel provided by an example of the present embodiment, the transmitters may emit infrared light, correspondingly, the receiver is configured to receive the infrared light.

For example, in the touch panel provided by an example of the present embodiment, the base substrate includes a display panel. Therefore, the touch panel may achieve a display function. The display panel may be a liquid display panel, an organic light emitted diode (OLED) display panel or an electronic paper and so on.

For example, in the touch panel provided by an example of the present embodiment, the base substrate includes a flexible display panel. Therefore, the base substrate is more easily deformed by the tonal operation, so that the touch panel provided by the present embodiment can be conveniently touched. It is obvious that the base substrate may also include a rigid display panel, as long as the display panel can be deformed under the pressure of the touch operation.

Second Embodiment

Figure 4:
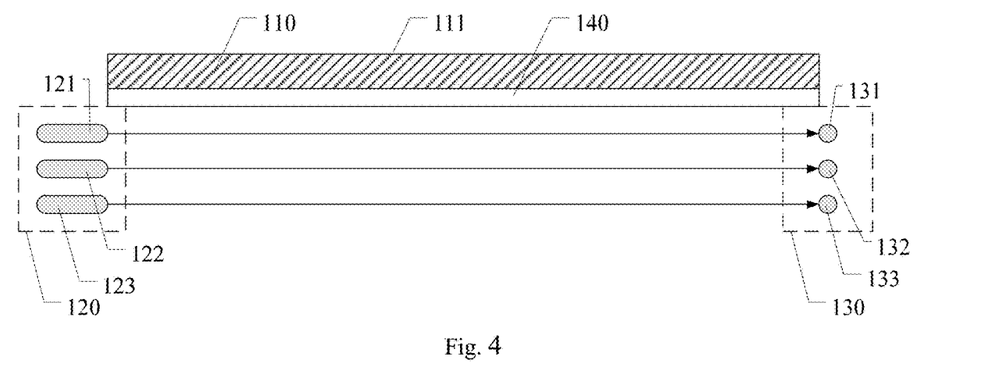
FIG. 4 is a structural schematic diagram of another touch panel provided by an embodiment of the present disclosure.
Figure 5:
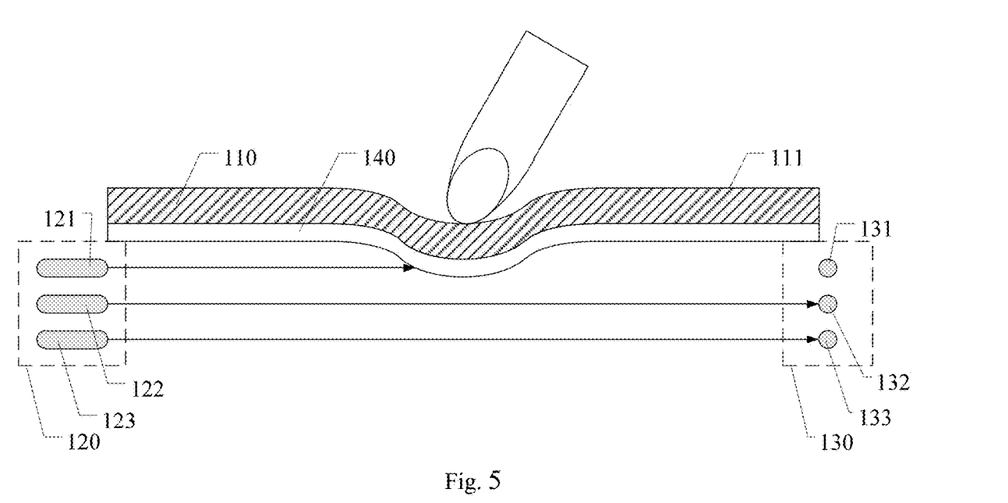
FIG. 5 is a schematic diagram of another touch panel upon being touched provided by an embodiment of the present disclosure.
Figure 6:
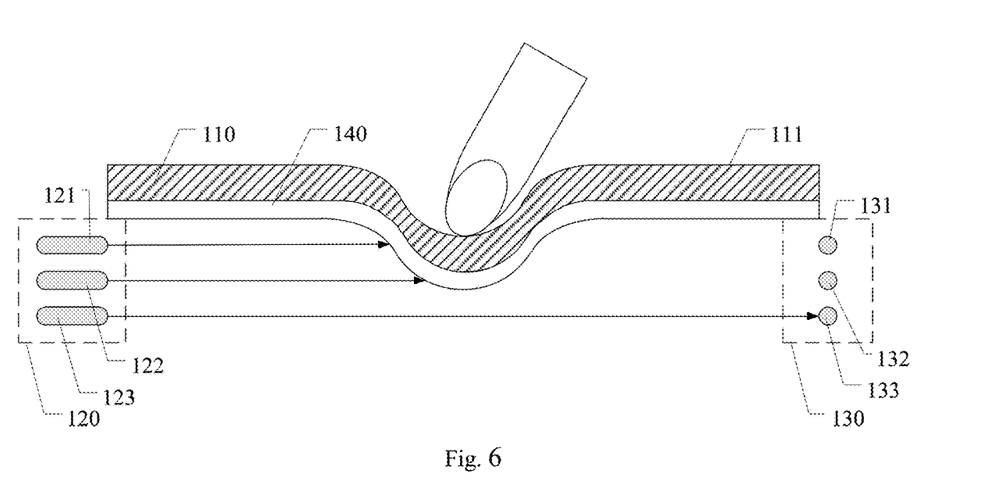
FIG. 6 is a schematic diagram of another touch panel upon being touched provided by an embodiment of the present disclosure.
Figure 7:
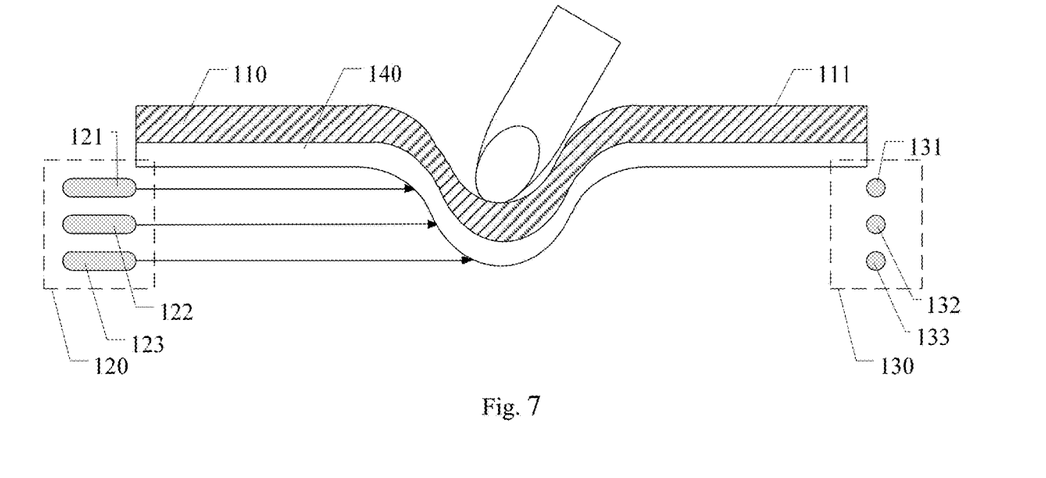
FIG. 7 is a schematic diagram of another touch panel upon being touched provided by an embodiment of the present disclosure.

On the basis of the first embodiment, the present embodiment provides a touch panel, as illustrated in FIG. 4, the touch panel includes a base substrate 110, a plurality of transmitter groups 120 and a receiver 130. The base substrate 110 has a touch surface 111, the touch surface 111 is a surface that is touched by a finger or a touch pen upon a touch operation occurring. The transmitter groups 120 include a first transmitter 121, a second transmitter 122 and a third transmitter 123. The receiver 130 includes a first sub-receiver 131, a second sub-receiver 132 and a third sub-receiver 133. The light emitted by different transmitters in each of the transmitter groups is received by different sub-receivers, that is, the first transmitter 121 is disposed corresponding to the first sub-receiver 131, the light emitted by the first transmitter 121 is received by the first sub-receiver 131; the second transmitter 122 is disposed corresponding to the second sub-receiver 132, the light emitted by the second transmitter 122 is received by the second sub-receiver 132; the third transmitter 123 is disposed corresponding to the third sub-receiver 133, the light emitted by the third transmitter 123 is received by the third sub-receiver 133. Therefore, in the present embodiment, a pressure level for judging the magnitude of the pressure of the touch operation may be increased by disposing the third transmitter 123 and the third sub-receiver 133. For example, when the number of the plurality of transmitters in the transmitter groups in the touch panel is 2, the touch panel may recognize two pressure levels, which corresponding to a case that a transmitter in the transmitter groups is blocked and a case that two transmitters in the transmitter group are blocked; the touch panel provided by the present embodiment may recognize three pressure levels. For example, as illustrated in FIG. 5, when the pressure of the touch operation is relative small, the deformation generated on the base substrate 110 only prevents the light emitted by the first transmitter 121 from entering the receiver 130; as illustrated in FIG. 6, when the pressure of the touch operation is relative large, the deformation generated on the base substrate 110 simultaneously prevents the light emitted by the first transmitter 121 and the second transmitter 122 entering the receiver 130; as illustrated in FIG. 7, when the pressure is larger, the deformation generated on the base substrate 110 simultaneously prevents the light emitted by the first transmitter 121, the second transmitter 122 and the third transmitter 123 from being on the receiver 130. Therefore, the magnitude of the pressure of the touch operation may be judged by the change of the light received by the receiver, and three pressure levels are provided. It should be noted that, the number of the plurality of transmitters in the touch panel provided by an embodiment of the present disclosure is not limited to two or three. For example, when the touch panel needs more pressure levels, the number of the transmitters in the same transmitter group may be disposed according to a deformability of the base substrate, and the magnitude and an arrangement accuracy of the transmitters.

For example, in the touch panel provided by an example of the present embodiment, as illustrated in FIG. 4 to FIG. 7, the touch panel further includes a light shield layer 140. The light shield layer 140 is disposed between the base substrate 110 and the transmitter groups 120, the light shield layer 140 is configured to prevent light from the touch surface 111 of the base substrate 110 which has a wavelength the same as that of the light (for example, the light has the wavelength same as that of the light emitted by the plurality of transmitters in the external ambient light) emitted by the plurality of transmitters 120 (for example, the first transmitter 121, the second transmitter 122 and the third transmitter 123) from entering the receiver 130. Therefore, the touch panel provided by the present embodiment may prevent the light from the touch surface which has the wavelength the same as that of the light emitted by the plurality of transmitters from interfering the touch sensing, so as to improve the accuracy and sensitivity of touch.

For example, in the touch panel provided by an example of the present embodiment, the light shield layer may be a photonic crystal layer. Because the photonic crystal can completely reflect incident light having a wavelength falling within a photonic bandgap range of the photonic crystal, the light cannot pass through the photonic crystal, so that the photonic bandgap of the photonic crystal layer may be set according to the wavelength of the light emitted by the plurality of transmitters so as to prevent the light from the touch surface which has the wavelength the same as that of the light emitted by the plurality of transmitters from interfering the touch sensing.

For example, in the touch panel provided by an example of the present embodiment, the transmitters are used to emit infrared light, the light shield layer is a photonic crystal layer, and the photonic crystal layer has a bandgap range of 780 nm-2500 nm. Certainly, the embodiments of the present disclosure include, but are not limited thereto, the transmitters may also emit the light having other wavelengths, correspondingly thereto, the bandgap range of the photonic crystal layer includes the wavelength of the light emitted by the transmitters.

For example, in the touch panel provided by an example of the present embodiment, the receiver includes a photoelectric conversion element, the photoelectric conversion element is capable of converting the light irradiated on the photoelectric conversion element into a current. At this point, the touch panel further includes an amplification circuit disposed corresponding to the photoelectric conversion element as mentioned above, the amplification circuit is configured to amplify the current generated by the photoelectric conversion element, and the touch panel further includes an analyzing circuit in communication with the amplification circuit, the analyzing circuit is used to analysis the presence or absence of the touch operation and the magnitude of the pressure, and the touch position according to enlarged current.

Figure 8:
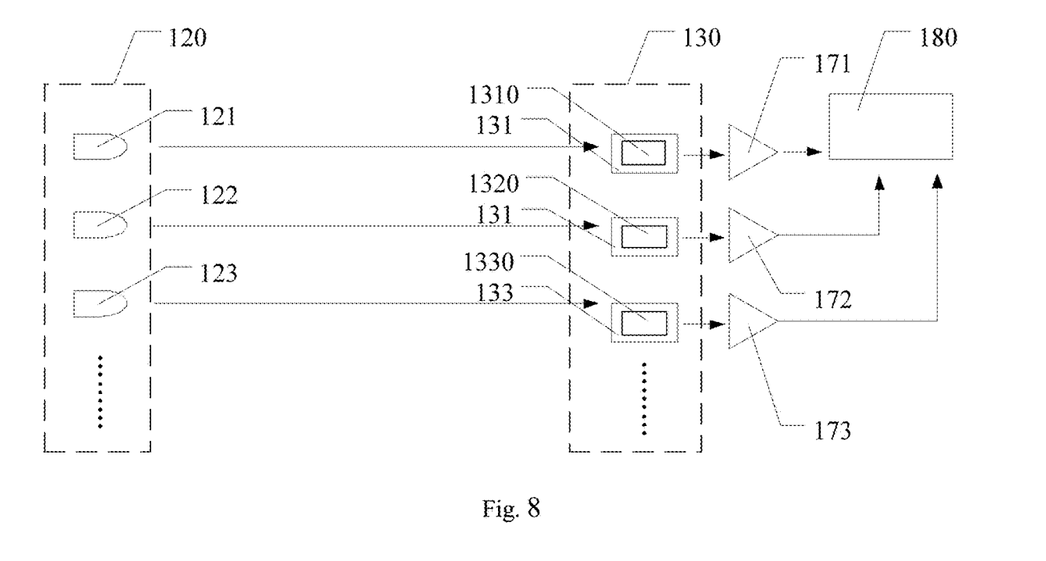
FIG. 8 is a schematic diagram showing a touch panel judges a touch operation provided by an embodiment of the present disclosure.

For example, as illustrated in FIG. 8, the receiver 130 includes the first sub-receiver 131, the second sub-receiver 132 and the third sub-receiver 133; the first sub-receiver 131 includes a first photoelectric conversion element 1310, the first photoelectric conversion element 1310 may convert the light emitted by the first transmitter 121 which is received by the first sub-receiver 131 into a current; the second sub-receiver 132 includes a second photoelectric conversion element 1320, the second photoelectric conversion element 1320 may convert the light emitted by the second transmitter 122 which is received by the second sub-receiver 132 into a current; the third sub-receiver 133 includes a third photoelectric conversion element 1330, the third photoelectric conversion element 1330 may convert the light emitted by the third transmitter 123 which is received by the third sub-receiver 133 into a current. The touch panel further includes a first amplification circuit 171 disposed corresponding to the first photoelectric conversion element 1310, a second amplification circuit 172 disposed corresponding to the second photoelectric conversion element 1320 and a third amplification circuit 173 disposed corresponding to the third photoelectric conversion element 1330; the first amplification circuit 171, the second amplification circuit 172 and the third amplification circuit 173 are respectively used to amplify the current generated by each photoelectric conversion element; and the analyzing circuit 180 in communication with each amplification circuit, the analyzing circuit 180 is used to analysis the presence or absence of the touch operation and the magnitude of the pressure and the touch position according to enlarged current.

Figure 9:
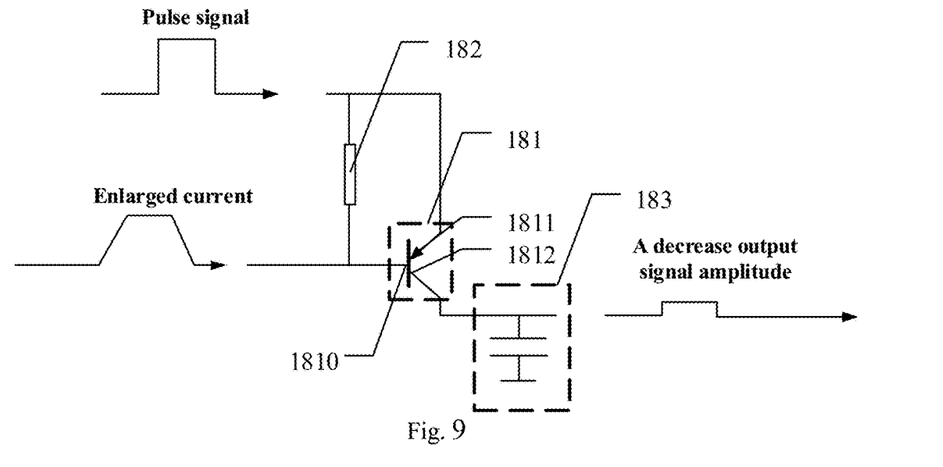
FIG. 9 is a schematic diagram of an analyzing circuit provided by an embodiment of the present disclosure.

For example, as illustrated in FIG. 9, the analyzing circuit 180 may include a triode 181, a pull-up resistor 182 and a counter 183. The triode 181 includes a base electrode 1810, a collector 1811 and an emitter 1812; the base electrode 1810 is connected to an amplified current, the collector 1811 is connected to the pulse signal, for example, the pulse signal may be a voltage pulse with 3.3V, the emitter 1812 may be connected to the counter 183. When the base electrode 1810 of the triode 181 has a current input, the triode 181 (N-type) is caused to form a larger voltage drop, resulting in a decrease in an amplitude of an input pulse signal. For example, when the collector 1811 inputs a voltage pulse of 3.3V, the amplitude of an output signal of the emitter 1812 may drop below 1.5V, at this point, the analyzing circuit may judge that there is light irradiation on the photoelectric conversion element. When the base electrode 1810 of the triode 181 has no current input, the voltage drop of the triode 181 may be an intrinsic voltage drop of the triode 181, the amplitude of the output signal of the emitter 1812 is a normal amplitude (the amplitude of the input pulse signal minus the intrinsic voltage drop of the triode), at this point, the analyzing circuit may judge there is no light irradiation on the photoelectric conversion element, and the counter 183 may count that times of the amplitude of the output signal in each of the transmitter groups is normal or decreased. Therefore, the analyzing circuit may judge the number of the light emitted by blocked transmitters in each of the transmitter groups by analyzing a case of amplified current so as to judge the presence and absence of the touch operation, the magnitude of the pressure and the position of the touch operation. It should be noted that, the above mentioned triode is described as an N-type triode as an example, certainly, embodiments of the present embodiment include but are not limited thereto, the triode can also be a P-type triode.

Third Embodiment

Figure 10:
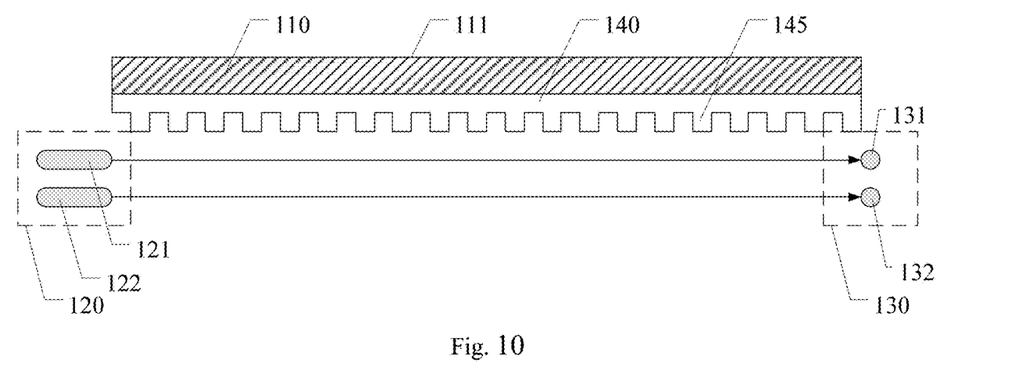
FIG. 10 is a structural schematic diagram of another touch panel provided by an embodiment of the present disclosure.
Figure 11:
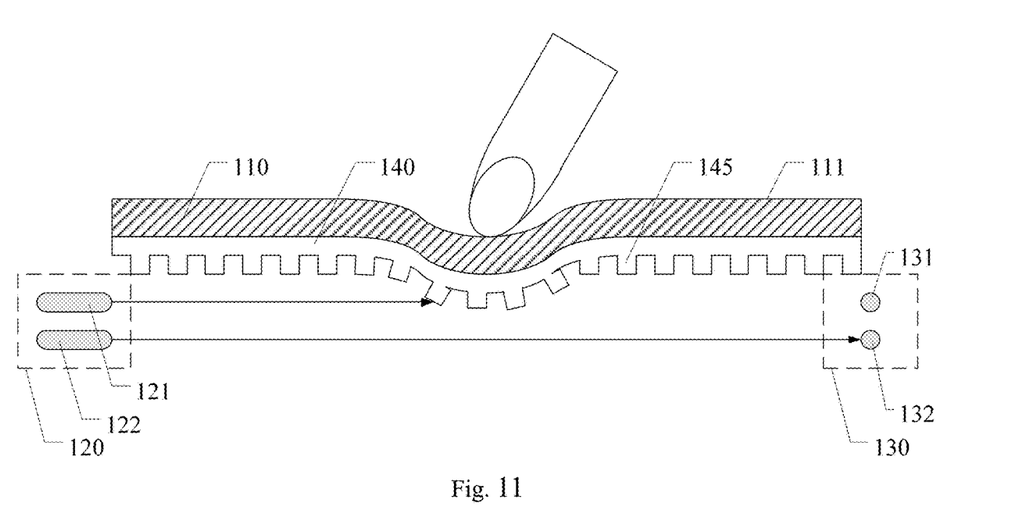
FIG. 11 is a schematic diagram of another touch panel upon being touched provided by an embodiment of the present disclosure.
Figure 12:
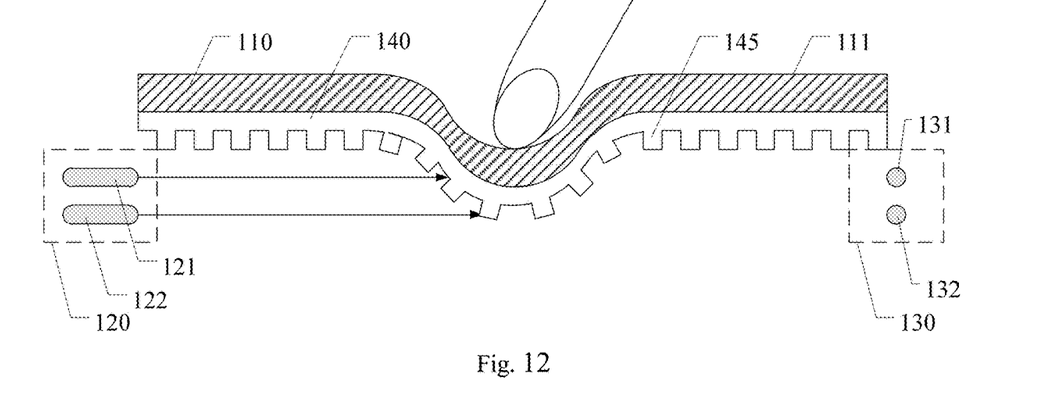
FIG. 12 is a schematic diagram of another touch panel upon being touched provided by an embodiment of the present disclosure.

On the basis of the first embodiment, the present embodiment provides a touch panel, as illustrated in FIG. 10 to FIG. 12, the touch panel further includes a photonic crystal layer 140 disposed between the base substrate 110 and the transmitter groups 120, and a plurality of photonic crystal protrusions 145, the photonic crystal protrusions 145 are disposed at intervals on a side of the photonic crystal layer 140 away from the touch surface 111. The plurality of photonic crystal protrusions 145 are configured to block the light between the transmitter groups 120 and the receiver 130. Because the photonic crystal protrusions 145 have a relative volume, which may improve the accuracy of the touch panel provided by the present embodiment.

For example, in the touch panel provided by an example of the present embodiment, the transmitters are used to emit infrared light, the light shied layer is the photonic crystal layer, and the photonic crystal layer has a bandgap range of 780 nm-2500 nm.

Fourth Embodiment

Figure 13:
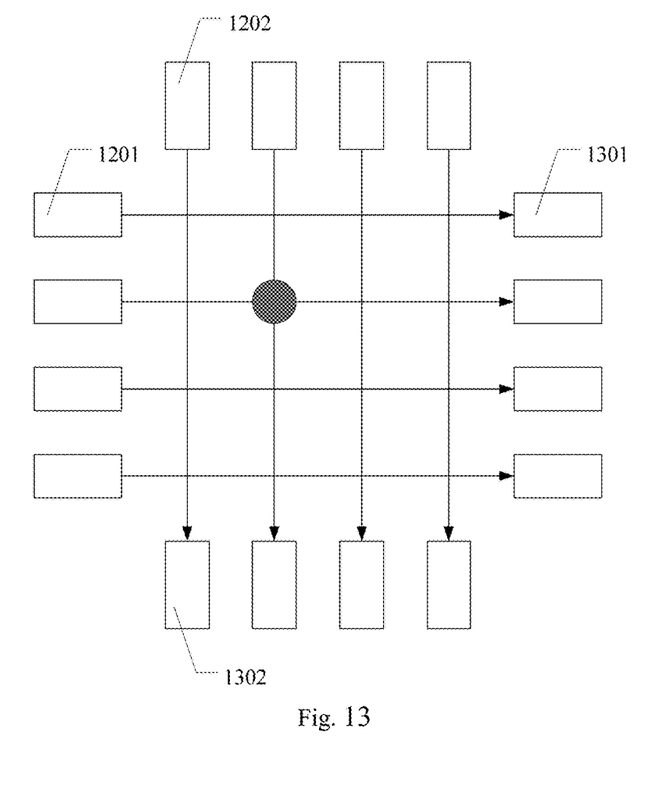
FIG. 13 is a plan view of a touch panel provided by an embodiment of the present disclosure.

Oil the basis of the first embodiment to the third embodiment, the present embodiment provides a touch panel, as illustrated in FIG. 13, the plurality of transmitter groups 130 include row transmitter groups 1201 arranged in a first direction and column transmitter groups 1202 arranged in a second direction, the first direction is perpendicular to the second direction.

In the touch panel provided by the present embodiment, the light emitted by the row transmitter groups 1201 and the column transmitter groups 1202 may cross with each other to define a touch area, when the touch operation is generated in the touch area, the light emitted by transmitters in the row transmitter groups and the column transmitter groups corresponding to a touched position may be blocked, so that the position of the touch operation in the touch area may be judged according to an information of the row transmitter groups and the column transmitter groups. Therefore, the touch panel provided by the present embodiment not only, achieves force touch but also achieves positioning of the touch operation, and does not need to dispose an addition touch electrode structure for the positioning of the touch operation, so as to reduce and even eliminate interference of the electrical signals of the touch electrodes on the display panel, and reduce and even eliminate the influence of the touch electrodes and leads on the light transmittance of the display panel.

It should be noted that, embodiments of the present embodiment include but are not limited thereto, the transmitter groups may also only include the row transmitter groups or the column transmitter groups, at this point, the positioning of the touch operation may rely on other touch structures to achieve.

Figure 14:
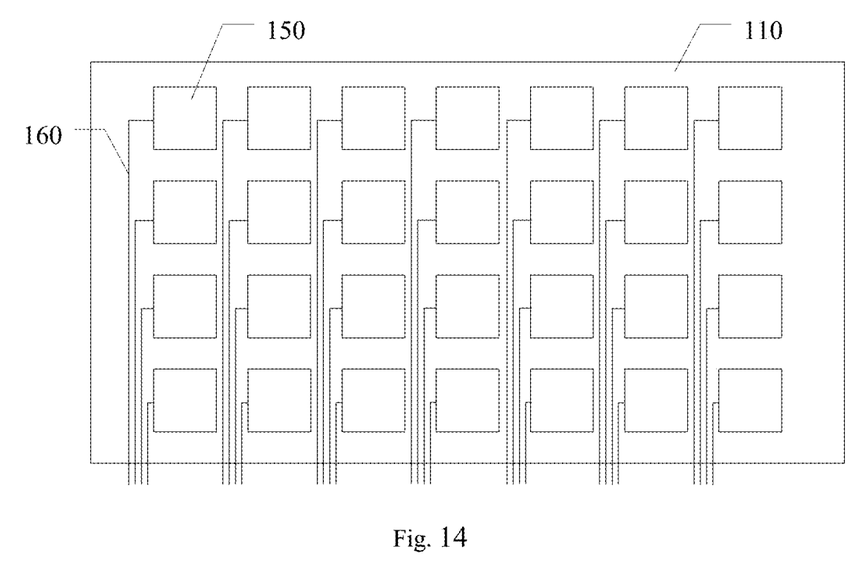
FIG. 14 is a plan view of another touch panel provided by an embodiment of the present disclosure.

For example, as illustrated in FIG. 14, the touch panel provided by the present embodiment may further include a plurality of self capacitance electrodes 150 arranged in a matrix which are disposed on the base substrate 110 to achieve the positioning of the touch operation. The plurality of the self capacitance electrodes 150 may be let out through leads 160.

Figure 15:
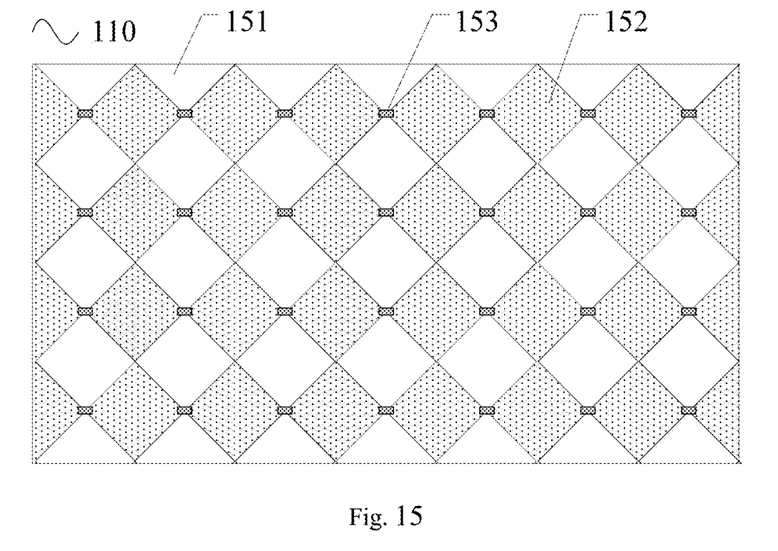
FIG. 15 is a plan view of another touch panel provided by an embodiment of the present disclosure.

For example, as illustrated in FIG. 15, the touch panel provided by the present embodiment may further include a plurality of touch driving electrodes 151 and a plurality of touch sensing electrodes 152 which are disposed on the base substrate to achieve the positioning of the touch operation.

Fifth Embodiment

The present embodiment provides a display device, which includes the touch panel in any one of the above embodiments. Because the display device includes the display panel described in any one of the above embodiments, the display panel has beneficial effects corresponding to the beneficial effects of the touch panel included therein, which may refer to related description in the above mentioned embodiments, embodiments of the present disclosure are not described herein again.

The display device may be any product or component having a display function such as a mobile phone, a tablet computer, a television, a display, a laptop, a digital photo frame, a navigator and so on. In addition, other structures or components in the display device may refer to a usual design, embodiments of the present disclosure are not described herein again.

Sixth Embodiment

Figure 16:
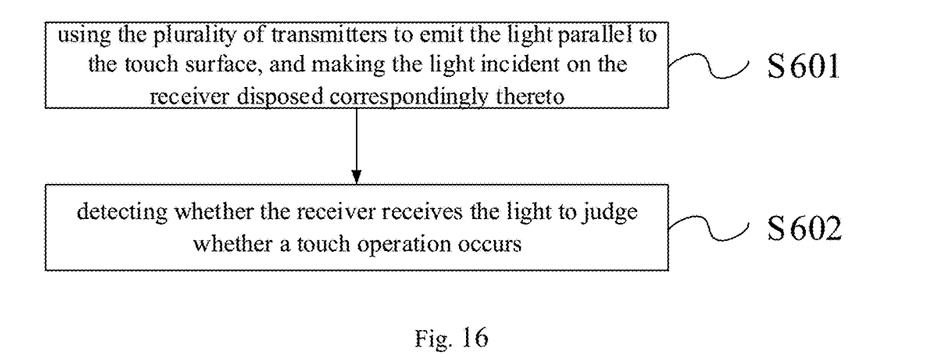
FIG. 16 is a flow chart of a touch detection method provided by an embodiment of the present disclosure.

The present embodiment provides a touch detection method for the touch panel, the touch panel includes a base substrate, a plurality of transmitter groups and a receiver. The base substrate has a touch surface, each of the transmitter groups includes a plurality of transmitters. The transmitters are configured to emit light, the receiver is disposed corresponding to the transmitter groups and configured to receive light emitted by the plurality of transmitters in the transmitter groups disposed correspondingly thereto. The transmitter groups are disposed on a side of the base substrate away from the touch surface, and the plurality of transmitters in the transmitter groups are arranged in a direction perpendicular to the touch surface, as illustrated in FIG. 16, the touch detection method includes the following steps S601-S602.

S601: using the plurality of transmitters to emit the light parallel to the touch surface, and making the light enter the receiver disposed corresponding to the transmitters.

For example, the infrared light may be emitted by the plurality of transmitters.

S602: detecting whether the receiver receives the light to judge whether a touch operation occurs.

For example, when the receiver does not receive the light, judging that a touch operation is occurred, when the radiation amount of the light received by the receiver is insufficient, judging that the touch operation is occurred; When the receiver may receive the light and the light has a normal radiation amount, judging that the touch operation is not occurred. It should be noted that, the normal radiation amount as mentioned above refers to the radiation amount of the light received by the receiver, when the light emitted by the plurality of the transmitters in the transmitter groups is successfully incident on the receiver disposed correspondingly thereto.

For example, the touch detection method provided by an example of the present embodiment further includes that detecting the radiation amount of the light received by the receiver to judge the magnitude of the pressure of the touch operation. Therefore, the touch detection method provided by the present embodiment is capable of detecting the magnitude of the pressure of the touch operation.

For example, the light received by the receiver can be converted to a current by the photoelectric conversion element, the radiation amount of the light received by the receiver can be judged by a magnitude of the current so as to judge the magnitude of the pressure of the touch operation.

For example, in the touch detection method provided by an example of the present embodiment, the receiver includes a plurality of sub-receivers, the light emitted by different transmitters in each of the transmitter groups is received by different sub-receivers, that is, the plurality of sub-receivers of the receiver is disposed in one-to-one correspondence with the plurality of transmitters in the transmitter groups disposed corresponding to the receiver, the touch detection method further includes: detecting number of the sub-receivers that received the light in the plurality of sub-receivers disposed in one-to-one correspondence with the plurality of transmitters in a same transmitter group to judge the magnitude of the pressure of the touch operation.

For example, in the touch detection method provided by an example of the present embodiment, the receiver further includes a photoelectric conversion element, the touch detection method further includes: using the photoelectric conversion element in the receiver to convert the light received by the receiver to an induction current; amplifying the induction current (for example, the induction current is amplified by an amplification circuit); and detecting a magnitude of the induction current after amplifying to judge whether the receiver receives the light and the radiation amount of the light that is received, so that judging the presence or absence of the touch operation and the magnitude of the pressure of the touch operation.

For example, in the touch detection method provided by an example of the present embodiment, which further includes: generating different touch commands according to the magnitude of the pressure of the touch operation. For example, in a case that the touch panel using the touch detection method provided by the present embodiment has three pressure levels, when the pressure of the touch operation is a first pressure level, generating a first touch comment; when the pressure of the touch operation is a second pressure level, generating a second touch comment; when the pressure of the touch operation is a third pressure level, generating a third touch comment.

Seventh Embodiment

Figure 17:
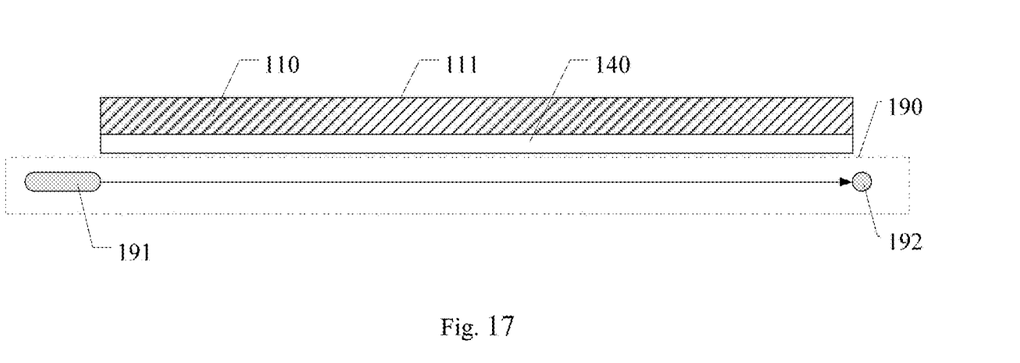
FIG. 17 is a structural schematic diagram of a touch panel provided by an embodiment of the present disclosure.

The present embodiment provides a touch panel, as illustrated in FIG. 17, which includes a base substrate 110, a photoelectric crystal layer 140 and a light touch unit 190. The base substrate 110 includes a touch surface 111, the light touch unit 190 includes a plurality of a light generator 191 and a light sensor 192 disposed correspondingly thereof. The photoelectric crystal layer 140 is disposed between the base substrate 110 and the light touch unit 190, and configured to prevent light from the touch surface 111 of the base substrate 110 which has a same wavelength as the light (for example, the light has the same wavelength as the light emitted by the plurality of transmitters in the external ambient light) emitted by the light generator 191 from entering the light sensor. Therefore, the touch panel provided by the present embodiment may prevent the light from the touch surface which has the same wavelength as the light emitted by the plurality of transmitters from interfering the touch sensing, so as to improve the accuracy and sensitivity of touch. It should be noted that, the light touch unit as mentioned above may include the plurality of transmitter groups and the receiver in embodiments as mentioned above, and the light generator and the light sensor as mentioned above may be a transmitter and a receiver respectively as mentioned above. Certainly, embodiments of the present disclosure include but are not limited thereto, the light touch unit may be a usual infrared touch unit without pressure recognition.

For example, in the touch panel provided by an example of the present embodiment, the light generator is configured to emit infrared light, and the photoelectric crystal layer has a bandgap range of 780 nm-2500 nm. Certainly, embodiments of the present disclosure include but are not limited thereto, the light generator may also emit the light with other wavelength, correspondingly thereto, the bandgap range of the photoelectric crystal layer includes the wavelength of the light emitted by the light generator.

The following points should to be explained:

1) The drawings of at least one embodiment of the present disclosure only relate to the structure in the embodiment of the present disclosure, and other structures may be referenced to the usual design.

2) In the absence of conflict, the features of the same embodiment and the different embodiments ban be combined with each other.

The above are only specific implementations of the present disclosure. However the scope of the present disclosure is not limited thereto, the scope of the present disclosure should be based on the scope of the claims.

The present application claims priority of China Patent application No. 201510853247.7 filed on Sep. 26, 2016, the content of which is incorporated in its entirety as portion of the present application by reference herein.

What is claimed is:

1. A touch panel, comprising:
 a base substrate, having a touch surface which is configured to receive a touch operation;
 a plurality of transmitter groups, each of the plurality of transmitter groups comprises a plurality of transmitters, the transmitters are configured to emit light; and
 a receiver, configured to receive light emitted by the transmitters,
 wherein the base substrate is configured to produces a deformation upon receiving the touch operation, the light received by the receiver corresponds to the deformation,
 the touch panel further comprises a light shield layer, the light shield layer is disposed between the base substrate and the transmitter groups, the light shield layer is configured to prevent light from the touch surface which has a wavelength the same as that of the light emitted by the plurality of transmitters from entering the receiver,
 the light shield layer is a photonic crystal layer.

2. The touch panel according to claim 1, wherein the receiver comprises a plurality of sub-receivers, different sub-receivers receive the light emitted by different transmitters in each of the transmitter groups.

3. The touch panel according to claim 1, further comprising:
 a plurality of photonic crystal protrusions, disposed at intervals on a side of the photonic crystal layer away from the touch surface.

4. The touch panel according to claim 1, wherein the photonic crystal layer has a bandgap range of 780 nm-2500 nm.

5. The touch panel according to claim 1, wherein the transmitters are configured to emit infrared light.

6. The touch panel according to claim 1, wherein the plurality of transmitter groups comprise row transmitter groups arranged in a first direction and column transmitter groups arranged in a second direction, the first direction is perpendicular to the second direction.

7. The touch panel according to claim 1, further comprising a plurality of self-capacitance electrodes arranged in a matrix and disposed on the base substrate.

8. The touch panel according to claim 1, further comprising a plurality of touch driving electrodes and a plurality of touch sensing electrodes which are disposed on the base substrate.

9. The touch panel according to claim 1, wherein the receiver further comprises a photoelectric conversion element.

10. A display device, comprising the touch panel according claim 1, and a display panel.

11. A touch detection method for a touch panel, wherein the touch panel comprises a base substrate, having a touch surface which is configured to receive a touch operation; a plurality of transmitter groups, each of the plurality of transmitter groups comprises a plurality of transmitters, the transmitters are configured to emit light; and a receiver, configured to receive light emitted by the transmitters, the base substrate is configured to produces a deformation upon receiving the touch operation, the light received by the receiver corresponds to the deformation, the touch panel further comprises a light shield layer, the light shield layer is disposed between the base substrate and the transmitter groups, the light shield layer is configured to prevent light from the touch surface which has a wavelength the same as that of the light emitted by the plurality of transmitters from entering the receiver, the light shield layer is a photonic crystal layer, the touch detection method comprises:
 using the plurality of transmitters to emit the light parallel to the touch surface, and making the light enter the receiver disposed corresponding thereto; and
 detecting whether the receiver receives the light to judge whether a touch operation occurs.

12. The touch detection method according to claim 11, further comprising:
 detecting light intensity received by the receiver to judge a magnitude of pressure of the touch operation.

13. The touch detection method according to claim 11, wherein the receiver comprises a plurality of sub-receivers, the light emitted by different transmitters in each of the transmitter groups is received by different sub-receivers, the method further comprising:
 detecting a number of the sub-receivers that receive the light in the plurality of sub-receivers disposed in one-to-one correspondence with the plurality of transmitters in a same transmitter group to judge the magnitude of the pressure of the touch operation.

14. The touch detection method according to claim 11, wherein the receiver comprises a photoelectric conversion element, the method further comprising:
 using the photoelectric conversion element in the receiver to convert the light received by the receiver to an induction current;
 amplifying the induction current; and
 detecting a magnitude of the induction current after amplifying to judge whether the receiver receives the light and the light intensity that is received.

15. The touch detection method according to claim 12, further comprising:

generating different touch commands according to the magnitude of the pressure of the touch operation.

16. The touch panel according to claim 1, wherein the transmitter groups are disposed on a side of the base substrate away from the touch surface, and the plurality of transmitters in each of the transmitter groups are arranged in a direction perpendicular to the touch surface.

17. The touch panel according to claim 1, wherein the base substrate is flexible.

\* \* \* \* \*